United States Patent [19]

Nemenz

[11] 4,237,353
[45] Dec. 2, 1980

[54] TELESCOPIC SPRING OPERABLE AS AN ELECTRIC SWITCH

[75] Inventor: Andreas U. Nemenz, Rutesheim, Fed. Rep. of Germany

[73] Assignee: Stabilus GmbH, Koblenz-Neuendorf, Fed. Rep. of Germany

[21] Appl. No.: 963,277

[22] Filed: Nov. 24, 1978

[30] Foreign Application Priority Data

Nov. 26, 1977 [DE] Fed. Rep. of Germany ... 7736254[U]

[51] Int. Cl.³ ................. H01H 3/12; H01H 35/38; F16F 9/50
[52] U.S. Cl. ............................. 200/52 R; 200/61.19
[58] Field of Search ............. 200/61.44, 61.62, 82 D, 200/61.19, 52 R, 153 LA, 153 M

[56] References Cited

U.S. PATENT DOCUMENTS

| | | | |
|---|---|---|---|
| 1,003,455 | 9/1911 | Hardwick | 200/84 R |
| 2,845,503 | 7/1958 | Durand | 200/52 R |
| 3,339,910 | 9/1967 | Jackson | 267/65 R |
| 3,606,375 | 9/1971 | Jackson | 280/712 |
| 3,610,611 | 10/1971 | Elliott et al. | 267/65 D |
| 3,853,331 | 12/1974 | Jones | 200/61.44 X |
| 3,919,509 | 11/1975 | Schnitzius | 200/82 D X |
| 4,163,970 | 8/1979 | Allinquant et al. | 200/61.62 |

FOREIGN PATENT DOCUMENTS

| | | |
|---|---|---|
| 2421007 | 11/1975 | Fed. Rep. of Germany . |
| 7603281 | 3/1977 | Fed. Rep. of Germany . |
| 2604529 | 8/1977 | Fed. Rep. of Germany . |
| 2339787 | 8/1977 | France . |
| 626867 | 7/1949 | United Kingdom . |
| 1210760 | 10/1970 | United Kingdom . |
| 1222293 | 2/1971 | United Kingdom . |
| 1284284 | 8/1972 | United Kingdom . |
| 1304550 | 1/1973 | United Kingdom . |

*Primary Examiner*—James R. Scott
*Attorney, Agent, or Firm*—Brumbaugh, Graves, Donohue and Raymond

[57] ABSTRACT

A telescopic spring has an outer spring member and an inner spring member movable inward and outward of a cavity in the outer spring member. Fasteners on the spring members outside the cavity permit the spring members to be fastened to respective objects. A compressed gas in the cavity outwardly biases the inner spring member. One of the spring members carries a contact element which engages a conductive face portion of the inner spring member during one portion of the movement of the inner spring member. Insulating matter insulates the contact element from the conductive face portion during another portion of the movement. Two electrical connectors outside the cavity are conductively connected to the contact element and the conductive face portion respectively.

17 Claims, 7 Drawing Figures

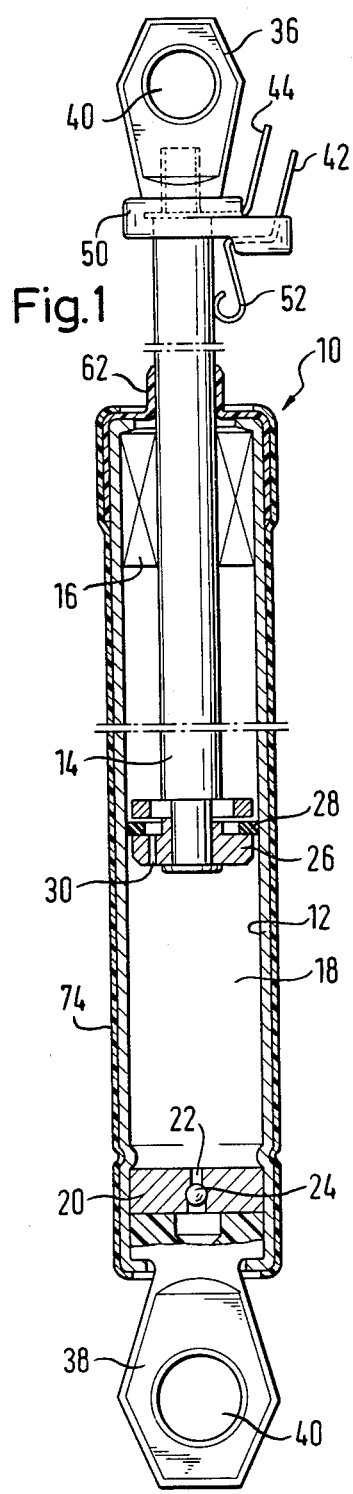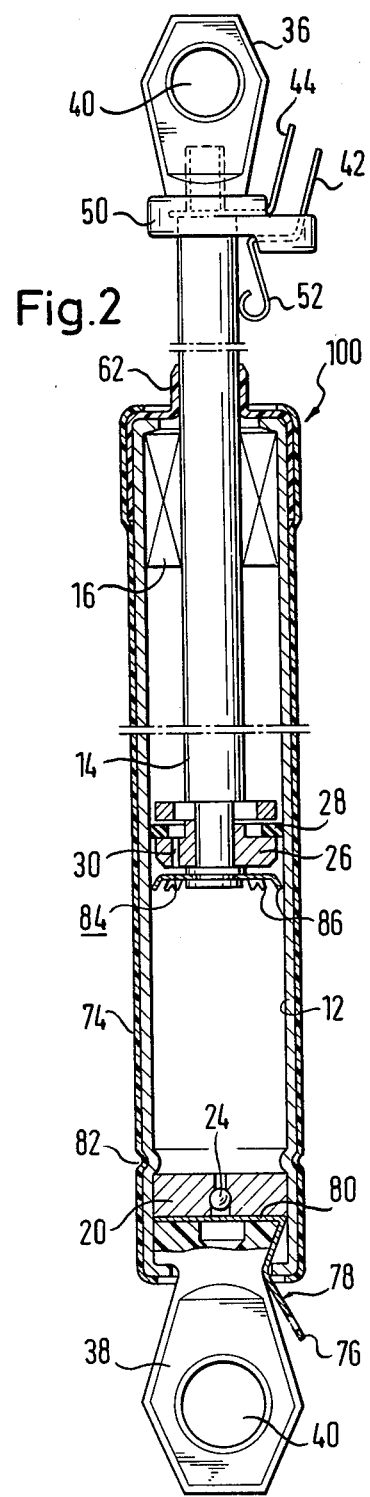

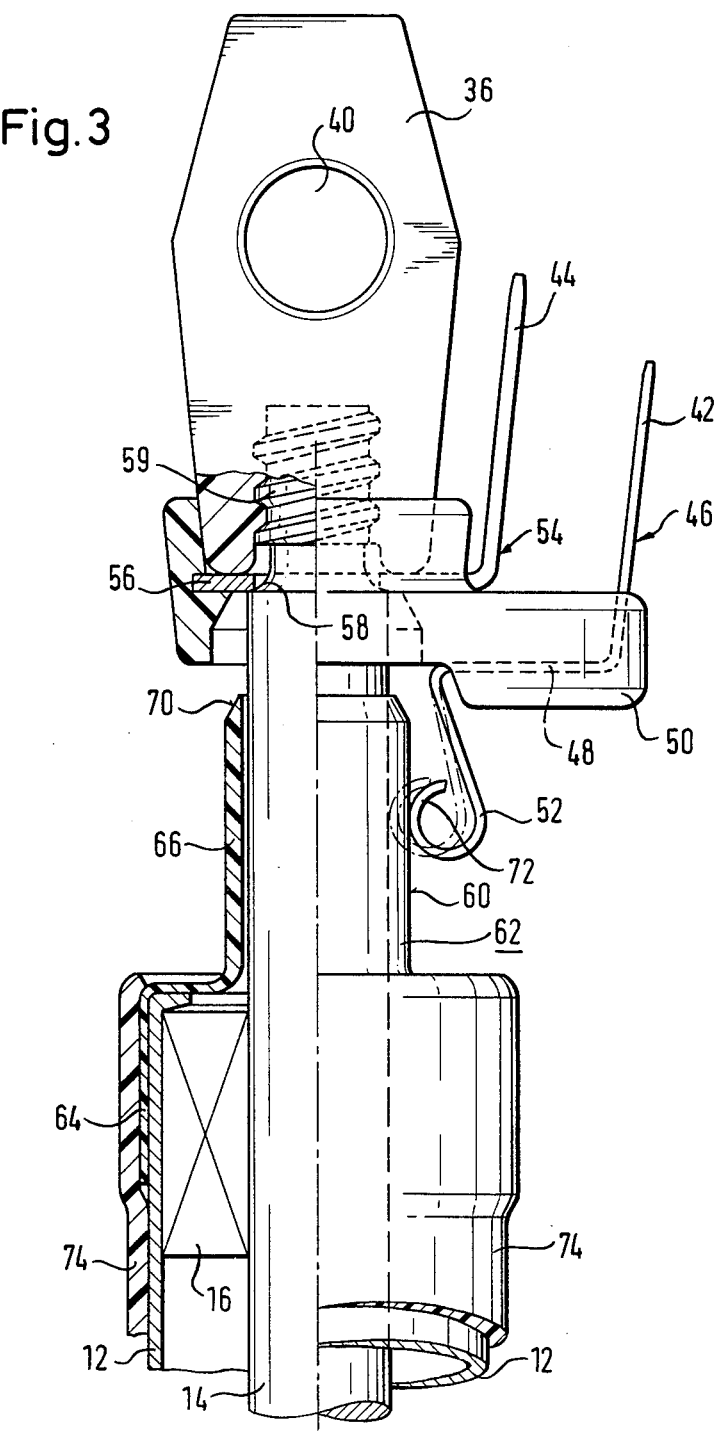

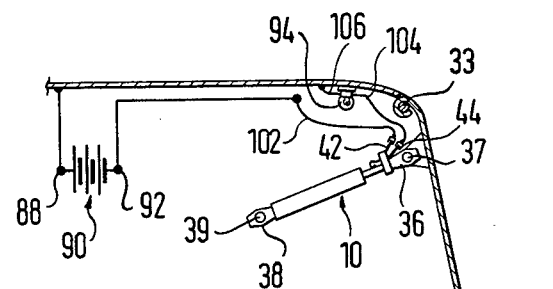
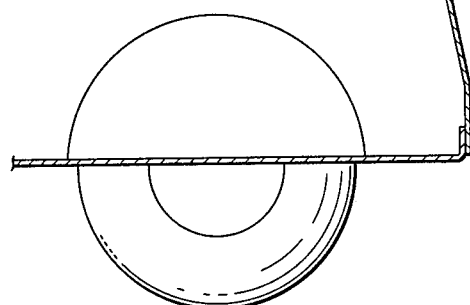
Fig.4
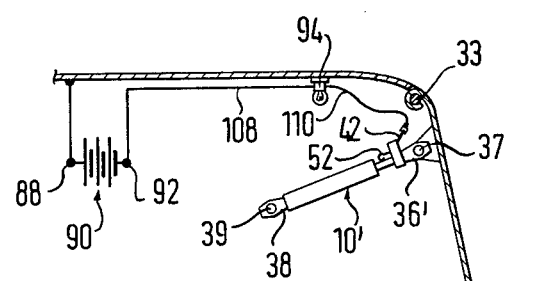
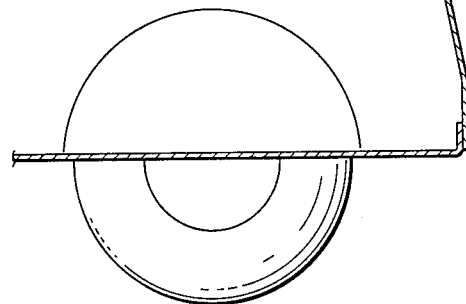
Fig.5

TELESCOPIC SPRING OPERABLE AS AN ELECTRIC SWITCH

BACKGROUND OF THE INVENTION

The invention relates to telescopic springs, such as gas springs, and particularly to a spring which can perform a switching function in an electric circuit.

In its more specific aspects, the invention is concerned with improvements in telescopic springs of the types disclosed in commonly owned U.S. Pat. No. 3,919,509 and in commonly owned application Ser. No. 39,269, filed May 16, 1979 as a continuation of now-abandoned U.S. application Ser. No. 804,316, filed June 7, 1977. The known springs are being used to advantage for providing a conductive path between a battery or other source of electric current on the body of an automotive vehicle and a current consuming device, such as a lamp, a heater, or a windshield wiper, on a cover mounted on the vehicle body for pivoting movement about a horizontal axis, the spring upwardly biasing the cover. Examples of such covers include the fifth window of a hatch-back passenger car, the trunk lid of a notch-back car, the hood of the motor compartment, and certain tailgates of station waggons. The known devices may automatically interrupt the current supply to the current consuming device in a certain position of the associated cover.

A primary object of this invention is the provision of a telescopic spring operable as an electric switch for applications for which the known springs are not, or not readily, suitable.

Another object is the provision of such a spring which is assembled at relatively low cost from readily available components, yet is sturdy and reliable in its operation.

With these and other objects in view, the spring of the invention includes an outer spring member formed with a cavity therein and an inner spring member connected to the outer spring member for telescoping movement inward and outward of the cavity between two terminal positions. A first portion of the inner spring member is secured in the cavity in both terminal positions, and a second portion projects outward of the cavity in both positions. Fasteners permit the outer spring member and the second portion of the inner spring member to be fastened to respective objects. The inner member is resiliently biased outward of the cavity. A contact element is mounted on one of the spring members, and the inner spring member has a conductive face portion engaged by the contact element during one portion of the movement of the inner spring member. In response to this movement, the contact element is insulated from the conductive face portion during another portion of the movement of the inner spring member. Two electrical connectors outside the cavity are conductively connected to the contact element and to the conductive face portion of the inner spring member respectively.

Other features, additional objects, and many of the attendant advantages of this invention will readily be appreciated as the same becomes better understood from the following detailed description of preferred embodiments when considered in connection with the appended drawing in which:

BRIEF DESCRIPTION OF THE DRAWINGS

FIG. 1 shows a telescopic spring of the invention in elevational section;

FIG. 2 illustrates a modification of the spring of FIG. 1 in a corresponding view;

FIG. 3 shows elements common to the springs of FIGS. 1 and 2 on a larger scale, partly in elevation and partly in elevational section; and FIGS. 4 to 6 are fragmentary, sectional side elevations of motor vehicles equipped with springs according to the invention.

DESCRIPTION OF THE PREFERRED EMBODIMENTS

Figure 6:
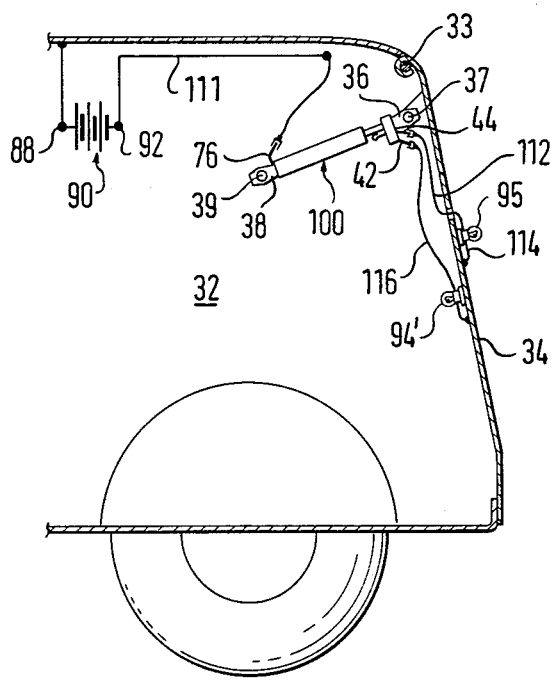

Referring initially to FIG. 1, there is shown a telescopic gas spring 10 whose principal members are a cylinder 12 and a piston rod 14. The piston rod 14 telescopes inward and outward of the sealed cavity 18 of the cylinder 12 through an annular seal 16, not shown in detail, at one axial end of the cylinder 12. The other end is closed by a bottom wall 20 provided with a passage 22 through which the cavity is filled with compressed air or nitrogen before the passage 22 is permanently sealed by a steel ball 24 seated in the passage 22 with a press fit.

The end portion of the piston rod 14 which is permanently retained in the cavity 18 is of reduced cross section and carries a piston 26 whose outer diameter is somewhat smaller than the inner diameter of the cylinder 12 so as to define therewith an annular gap. A piston ring 28 of elastomeric material may move axially on the piston 26 in frictional engagement with the cylinder wall to permit gas flow through the gap or to limit such flow to narrow, axial, throttling bores 30 in the piston of which only one is seen in FIG. 1. Plastic fasteners or fastening eyes 36, 38 having cylindrical, central openings 40 are mounted on the end wall 20 and on the end portion of the piston rod 14 which is permanently outside the cavity 18.

The structure described so far is well known and functions in a manner to well understood to require explicit description. The invention is more specifically concerned with the illustrated features which permit the spring 10 to operate as a switch in an electric circuit.

As is better seen in FIG. 3, connector blades 42, 44 spacedly project from plastic insulator 50 fastened between a shoulder 58 on the piston rod 14 and the fastening eye 36 which engages mating threads 59 on the piston rod 14. The connector blade 42 is an end portion of a strip 46 of spring-temper metal whose central portion 48 is embedded in the insulator 50. The other end portion 52 is partly bent into a circular arc.

The other connector blade 44 is similar in shape and size to the blade 42 and is an integral part of a piece 54 of spring-temper sheet metal including a flat, annular portion 56 partly embedded in the insulator 50, but having exposed annular, radial faces engaging the shoulder 58 and the fastener 36 so as to secure the insulator 50 in the illustrated position.

A plastic sleeve 62 has an expanded section 64 which envelops the end of the cylinder 12 seen in FIG. 3, and a section 66 of smaller diameter projecting axially from the cylinder 12 toward the fastener 36. The internal diameter of the sleeve section 66 is slightly larger than the outer diameter of the generally cylindrical, metallic piston rod 14 so that the rod can move freely in the bore of the sleeve section 66. The free, annular edge 70 of the section 66 is beveled. A coating 74 of thermally shrunk plastic covers the sleeve section 64 and the cylindrical outer face of the cylinder 12, thereby holding the sleeve 62 in the illustrated position.

As illustrated in FIG. 1 in fully drawn lines, the end portion 52 of the connector strip 46 is elastically deformed by contact of the outer sleeve surface 60 with the convexly arcuate face 72 of the strip portion 52. When the piston rod 14 moves outward of the cylinder 12, the face 72 travels over the beveled edge 70 and relaxes partly to engage the then exposed, cylindrical surface of the piston rod 14, as indicated in broken lines. When the piston rod 14 moves back inward of the cylinder 12, the beveled edge 70 and the arcuate face 72 cammingly cooperate to lift the strip portion 52 from the piston rod surface, and the insulating sleeve section 66 is interposed between the metal of the piston rod 14 and that of the connector strip 46.

The annular portion 56 of the metal piece 54 is held in permanent conductive contact with the piston rod 14 by the fastener 36. A conductive path between the connector blades 42, 44 is thus closed when the piston rod moves outward of the cylinder 12 from the illustrated position, and the path is interrupted between the conductive surface of the piston rod 14 and the strip portion 52, functioning as a contact spring, by the sleeve section 66. The portion of the spring 10 not shown in FIG. 3 has no electrical function.

The spring 100 illustrated in FIG. 2 combines every afore-described feature of the spring 10 with elements providing an additional, permanent connection between the piston rod 14 and a connector blade 76 which projects outward of the cylinder cavity adjacent the fastener 38 on the bottom wall 20. An external, annular groove 82 and a corresponding internal rib in the cylinder 12 secures the bottom wall 20 in one axial direction, and it is secured in the opposite direction by the fastener 38 which is held in position by an integral, radial flange of the cylinder 12.

The connector blade 76 is an integral part of a sheet metal element 78 a circular, annular portion 80 of which is clamped between the end wall 20 and the connector 38 in electrical contact with the cylinder 12. A star-shaped disk 84 of spring metal is attached to the end of the piston rod 14, and the points 86 of the disk 84 slide along the inner face of the cylinder 12 during piston movement to establish a reliable path of current from the connector blade 76 to both blades 42, 44 in the condition of the spring 100 shown in FIG. 2, and only to the blade 44 in the piston rod position illustrated in FIG. 3.

Typical applications for the springs 10, 100 and for minor variations of the same are shown in FIGS. 4 to 6 in connection with a motor vehicle whose body 32 is closed in a rearward direction by a fifth window 34 fastened to the top of the vehicle body by a hinge 33 whose axis is normally horizontal. Pivot pins 37, 39 on the window 34 and the body 32 are received in the respective openings of the fasteners 36, 38 of the spring 10. One terminal 88 of a storage battery 90 in the vehicle body 32 is grounded to the body, the other battery terminal 82 is connected to the connector blade 42 of the spring 10 by an insulated conductor 102. A similar conductor 104 connects the blade 44 to one terminal of a dome light 94 in the vehicle, and the other terminal of the dome light is grounded to the body 32 by a conductor 106.

As is not capable of being shown on the scale of FIG. 4, the battery circuit through the dome light 94 is interrupted between the blades 42, 44 in the manner evident from FIG. 3. When a non-illustrated latch or lock release the window 34, the window is swung upward on the hinge 33 by the spring 10 with or without the assistance of a human operator, and the dome light 94 is lit. It is turned off automatically when the window 34 is again closed.

In the otherwise similar arrangement of FIG. 5, a spring 10' is equipped with a metallic connector 36' on the outer end of the piston rod, so that the connector blade 44 may be omitted. When the window 34 shown in FIG. 5 is opened, current may flow from the insulated terminal 92 of the battery 90 through a conductor 108 to the dome light 94, thence through a conductor 110 to the blade 42 on the spring 10' which is connected to the grounded battery terminal 88 through the fastener 36', the pivot pin 37, and the conductively engaged metal parts of the window 34, the hinge 33 and the vehicle body 32.

Supply of current to two consuming devices by the spring 100 is illustrated in FIG. 6, in which the insulating fasteners 36, 38 of the spring are attached to pivot pins 37, 39 on the fifth window 34 and the vehicle body 32 in the afore-described manner. The battery terminal 92 is connected by a conductor 111 to the connector blade 76 on the cylinder of the spring 100 which is permanently connected with the blade 44. A conductor 112 leads from the blade 44 to one terminal of a license plate lamp 95 on the outer surface of the fifth window 34 whose other terminal is grounded to the metallic structure of the window and thereby to the battery terminal 88 by a lead 114.

The switched connector blade 42 is connected to another lamp 94' on the inner surface of the fifth window 34 by a conductor 116, and the other terminal of the lamp 94' is grounded to the window.

As is not specifically shown, but conventional in itself, an operator-controlled light switch may be arranged in circuit between the battery terminal 92 and the several lamps 94, 94', 95, and also the headlights and parking lights of the vehicle, not themselves illustrated. The license plate lamp 95 thus is energized whenever the headlights or parking lights are used, and the internal lights 94, 94' in the vehicle body 32 are additionally turned on when the window 34 is opened.

Other applications within and outside the field of automotive engineering will readily suggest themselves to those skilled in the art, and minor variations of the springs 10, 100, as exemplified by the spring 10', will readily be resorted to.

The switch arrangements in the springs 10, 100 interrupt an electrical circuit when the piston rod 10 moves inward of the cylinder 12 and approaches its innermost position because the insulating sleeve portion 66 is located as shown. However, circuit closing and opening in different relative positions of the two principal spring members may be brought about by insulating the contact spring 52 from a conductive face portion of the piston rod 14 in a different manner, as by partly coating the rod with insulating lacquer or plastic, or by making the piston rod partly of insulating material.

The blade-shaped connectors 42, 44, 76 are quickly and safely assembled with mating receptacles, and are preferred for this reason, but other connectors may be provided outside the cylinder cavity.

The specific configuration of the principal, telescoping spring members 12, 14 and the internal structure within the cylinder cavity may be varied, particularly in the spring 10, without affecting the electrical characteristics of the spring. Thus, a telescoping spring whose inner member is a plunger of uniformly cylindrical shape may replace the illustrated piston 26 and piston rod 14, particularly if the plunger is biased outward of the outer member or cylinder by a helical compression spring or the like which does not require tight sealing of the cylinder cavity.

Figure 7:
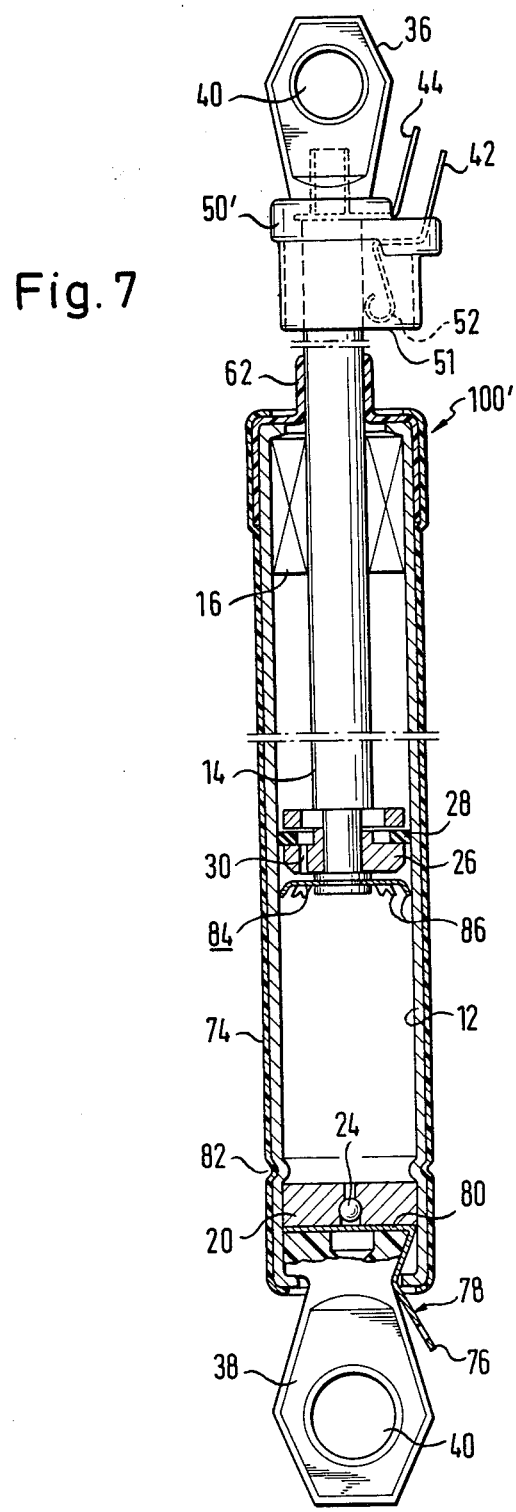
FIG. 7 illustrates a further modification of the spring of FIG. 1 in a corresponding view.

It should be understood, therefore, that the foregoing disclosure relates only to presently preferred embodiments, and that it is intended to cover all changes and modifications of the examples of the invention herein chosen for the purpose of the disclosure which do not depart from the spirit and scope of the appended claims. The spring 100' illustrated in FIG. 7 merely differs from the spring 100 shown in FIG. 2 with respect to the shape of the insulator 50, 50' respectively. The insulator 50' of the spring 100' is additionally provided with a cover 51, covering the strip portion 52 outwardly. The cover 51 in the form of a sleeve encircles the strip portion 52 and the piston rod 14 in the area of the strip portion 52. The cover 51 somewhat extends beyond the strip portion 52 in the direction of the cylinder 12. It is the object of the cover 51 to secure the strip portion 52 against dirt and damage by an impact or the like. Additionally the cover 51 serves as a protection against unauthorized bending of the strip portion 52. This is important in those cases in which the strip portion 52 is used as a switch of an alarm device of a vehicle.

What is claimed is:

1. A telescopic spring operable as an electric switch comprising;
    (a) an outer spring member formed with a cavity therein;
    (b) an inner spring member connected to said outer spring member for movement inward and outward of said cavity between two terminal positions,
        (1) a first portion of said inner spring member being located in said cavity in said two terminal positions; and
        (2) a second portion of said inner spring member projecting outward from said cavity in said two terminal positions,
        (3) said second spring member portion having an electrically conductive portion;
    (c) fastening means for fastening said outer spring member and said second portion of said inner spring member to respective objects;
    (d) yieldably resilient means in said cavity biasing said inner spring member outward of said cavity;
    (e) a contact element carried by one of said spring members outside said cavity, said electrically conductive portion of said inner spring member being engaged by said contact element during one portion of the movement of said inner spring member between terminal positions;
    (f) insulating means carried by the other of said spring members outside said cavity for insulating said contact element from said electrically conductive portion during another portion of the movement of said inner spring member between said terminal positions; and
    (g) two electrical connectors disposed outside said cavity for connection to electrical leads and conductively connected to said contact element and said electrically conductive portion, respectively.

2. A spring as set forth in claim 1, wherein said contact element has a fixed portion and a movable portion, said contact element being mounted on a part of said inner spring member outside said cavity such that said fixed portion is electrically insulated from said electrically conductive portion and said movable portion is resiliently biased into sliding contact with said electrically conductive portion, and said insulating means including cam means on said outer spring member engaging said movable portion of said contact element for moving said movable portion away from said electrically conductive portion during said other portion of the movement of said inner spring member between said terminal positions.

3. A spring as set forth in claim 2, wherein said part of said inner spring member consists essentially of insulating material and is interposed between said second portion of said inner spring member and said fastening means for fastening said second portion to an object.

4. A spring as set forth in claim 1, wherein said inner spring member during said one portion of the movement thereof projects farther from said cavity than during said other portion of the movement.

5. A spring as set forth in claim 4, wherein said cam means include a tubular element of insulating material on said outer spring member to receive said inner spring member.

6. A spring as set forth in claim 1, wherein said connectors are mounted on the same spring member.

7. A spring as set forth in claim 6, wherein said connectors are mounted on said inner spring member.

8. A spring as set forth in claim 1, wherein said connectors are mounted on respective spring members.

9. A spring as set forth in claim 1, wherein one of said connectors constitutes an element of the fastening means for fastening one of said spring members to an object.

10. A spring as set forth in claim 1, wherein said fastening means include respective fastening elements of insulating material on said spring members.

11. A telescopic spring operable as an electric switch comprising:
    (a) an outer spring member formed with a cavity therein;
    (b) an inner spring member connected to said outer spring member for movement inward and outward of said cavity between two terminal positions,
        (1) a first portion of said inner spring member being located in said cavity in said two terminal positions, and
        (2) a second portion of said inner spring member projecting outward from said cavity in said two terminal positions,
        (3) said second spring member portion having an electrically conductive portion;
    (c) fastening means for fastening said outer spring member and said second portion of said inner spring member to respective objects;
    (d) yieldably resilient means in said cavity biasing said inner spring member outward of said cavity;
    (e) an electrical contact element having a fixed portion and a movable portion, said contact element being mounted on one of said spring members outside said cavity such that said fixed portion is electrically insulated from said electrically conductive portion of said inner spring member and said movable portion is resiliently biased into sliding contact with said electrically conductive portion of said inner spring member, (f) insulating means carried by the other of said spring members for electrically insulating said movable contact portion from said electrically conductive portion during a portion of the movement of said inner spring member between said terminal positions, said insulating means including a sleeve member having two sections offset in the direction of movement of said inner spring member, one of said sections enveloping said outer spring member and the other section movably receiving said second portion of said inner spring member, said other section of said sleeve member being received between said movable contact portion and said electrically conductive portion during said portion of the movement of said inner spring member, whereby an electrical connection is established between said contact element and said electrically conductive portion during one portion of the movement of said inner spring member between said terminal position and is interrupted during another portion of such movement; and (g) two electrical connectors disposed outside said cavity for connection to electrical leads and conductively connected to said contact element and said electrically conductive portion, respectively.

12. A spring as set forth in claim 11, wherein said outer spring member has an axis, said inner spring member is axially movable inward and outward of said cavity, and said contact element has a contact face directed toward said electrically conductive portion and convexly arcuate in section in a plane including said axis.

13. A spring as set forth in claim 1 or 11, wherein said cavity is sealed in said outer spring member, said yieldably resilient means include a gas in said cavity under superatmospheric pressure, said fastening means include a fastening member mounted on a part of said inner spring member farthest from said outer spring member in the direction of said movement, said contact element consists essentially of resilient metal, said electrically conductive portion of said inner spring member is elongated in the direction of said movement and of annular cross section.

14. A spring as set forth in claim 1 or 11, further comprising covering means fixed to one of said spring members and covering said contact element.

15. A spring as set forth in claim 14, wherein said covering means are mounted to the spring member bearing said contact element.

16. A spring as set forth in claim 14, wherein said covering means are fixed on a part of said inner spring member electrically insulated from said face portion.

17. A spring as set forth in claim 16 wherein said covering means are integral with said part of said inner spring member.

* * * * *